Nov. 10, 1931.  F. G. BROTZ  1,830,781
SWINGING CONTAINER FOR SINKS
Filed Aug. 26, 1927   2 Sheets-Sheet 1
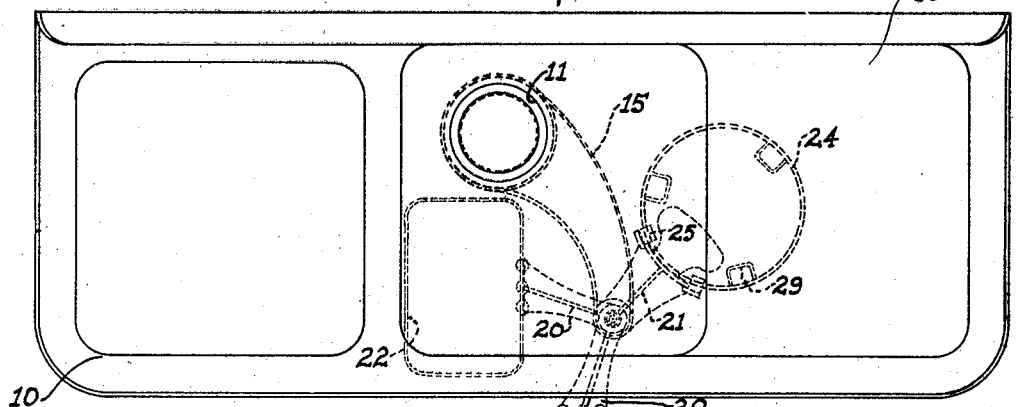
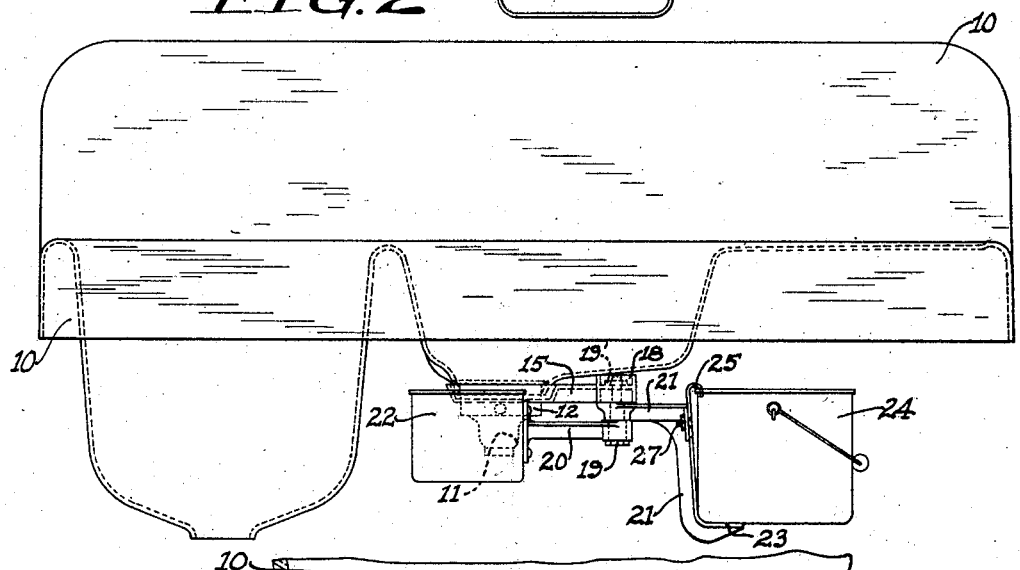
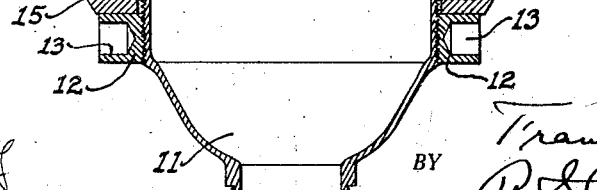
WITNESSES
M. E. Downey
Irving Rose
INVENTOR.
Frank G. Brotz
BY R. S. Caldwell
ATTORNEY.

Nov. 10, 1931.  F. G. BROTZ  1,830,781
SWINGING CONTAINER FOR SINKS
Filed Aug. 26, 1927   2 Sheets-Sheet 2
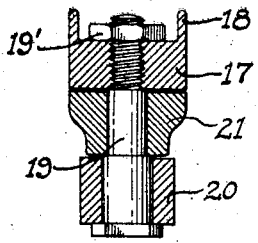
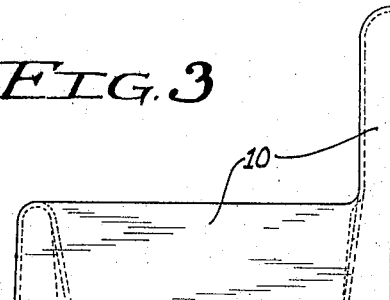
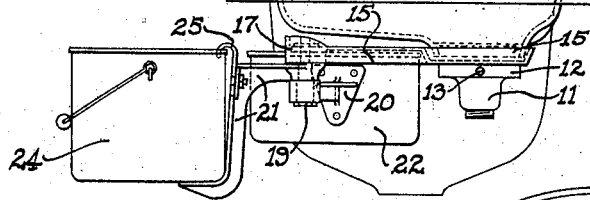
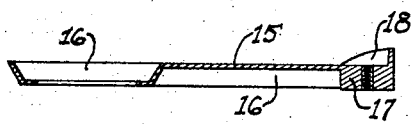
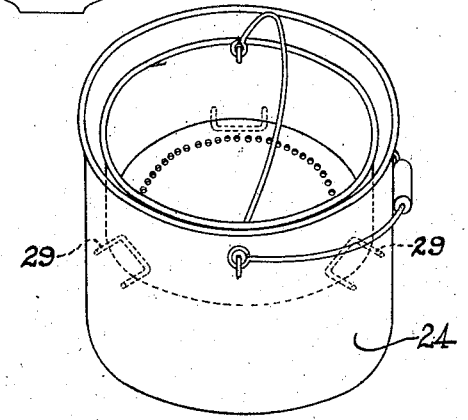
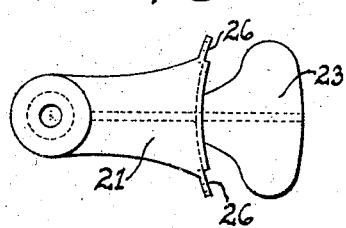
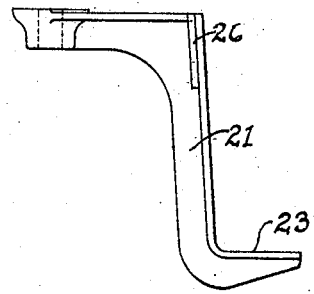
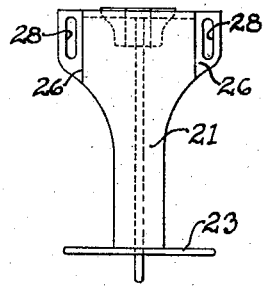
WITNESSES
INVENTOR.
Frank G. Brotz
BY
ATTORNEY.

Patented Nov. 10, 1931

1,830,781

UNITED STATES PATENT OFFICE

FRANK G. BROTZ, OF KOHLER, WISCONSIN, ASSIGNOR TO KOHLER COMPANY, OF KOHLER, WISCONSIN, A CORPORATION OF WISCONSIN

SWINGING CONTAINER FOR SINKS

Application filed August 26, 1927. Serial No. 215,663.

This invention relates to swinging containers for sinks and the like and has for its object to provide one or more containers for garbage, kitchen utensils and cleaning compounds for use at the sink capable of swinging from a position beneath the sink to an accessible position in front of the sink.

Another object of the invention is to provide such a swinging container capable of adjustment so as to be located at any desired part of the front of the sink when in its forward position to be capable of receiving garbage or other matter scraped from the sink.

Another object of the invention is to provide a swinging container with a strong and substantial support by pivotally mounting it on a stationary bracket incorporated in and clamped between parts of the waste assembly, so as to have the support of the sink itself.

Another object of the invention is to provide such a swinging container capable of having a garbage receptacle readily removed therefrom for emptying and cleaning it.

With the above and other objects in view the invention consists in the swinging container for sinks and the like as herein claimed, its parts and combinations of parts and all equivalents.

Referring to the accompanying drawings in which like characters of reference indicate the same parts in different views, Fig. 1 is a plan view of a sink constructed in accordance with this invention;

Fig. 2 is a front elevation thereof;

Fig. 3 is an end view thereof;

Fig. 4 is a sectional view of the waste assembly with the stationary bracket clamped in place;

Fig. 5 is a longitudinal sectional view of the stationary bracket;

Figs. 6, 7 and 8 are top, side and front views of the garbage receptacle bracket;

Fig. 9 is a perspective view of the garbage receptacle; and

Fig. 10 is a sectional view showing the pivotal connection of the swinging brackets.

In these drawings 10 indicates a sink which may be of any type but as here shown is of the type wherein the sink drain board and container of an electric dishwashing machine are formed in an integral casting.

To the drain outlet of the sink is secured a flanged funnel-like waste coupling 11 by means of its nut ring 12 threaded thereon and clamping the edge of the drain outlet of the sink body between the flange of the waste coupling 11 and said nut, the nut being preferably provided with spanner wrench sockets 13 for drawing it into a tight connection. Between the nut ring 12 and the gasket 14 for the edge of the sink outlet is firmly clamped a stationary bracket 15.

This bracket extends forwardly at any desired angle, determined upon before tightening the clamping ring 12, and is preferably curved as shown in the plan view to accommodate one of the receptacles in front of it. It is rigidly braced by flanges 16 which extend upwardly and outwardly around the clamping ring-engaged portion, and downwardly along the outreaching portion until reaching the solid end 17, which is partly surrounded by an upstanding flange 18.

Threaded in the end of this stationary bracket from beneath is a flanged and shouldered pivot bolt 19 fixed in place by a jamb nut 19' threaded thereon and engaging the top of the stationary bracket and hidden from view by the upstanding flange 18. The shoulder of this bolt provides two separate pivotal mountings of different diameters for two swinging brackets 20 and 21, the former resting on the flanged head of the bolt and the latter resting on the shoulder of the bolt.

The swinging ribbed bracket 20 terminates in an attaching plate riveted or otherwise secured to a container 22 for holding small kitchen utensils used about the sink and is capable of swinging on its pivotal support from the position in front of the sink shown in full lines in Fig. 1, to a position beneath the sink shown in dotted lines in said figure.

The other swinging ribbed bracket 21, shown in detail in Figs. 6, 7 and 8, is of angular shape terminating in a flat step 23 on which rests a container 24 preferably in the form of a bucket for holding garbage. Hooks 25 slidable in shouldered guides 26 at the upper end of the bracket 21 and having attaching bolts 27 slidable in vertical slots 28 of said guides serve to engage the rim of the garbage container 24 to hold it securely on the step but permit it to be readily removed therefrom either by tilting it off of the step or by raising the hooks. This garbage container may be normally kept beneath the sink, as shown by dotted lines in Fig. 1, but may be readily swung to a forward position in front of the sink, as shown in Fig. 3, to receive garbage and particularly to have garbage scraped into it directly from the sink. This position for the garbage container may be made to locate it wherever desired along the front of the sink by a proper adjustment of the stationary bracket 15 while the clamping ring is loosened for that purpose.

The garbage container may be used with or without the other container and preferably has a smaller perforated bucket-like container supported therein some distance above the bottom by resting it on internal lugs 29, shown by dotted lines in Fig. 9.

By means of this invention, a swinging container is provided having a strong and rigid support from the sink itself and without the necessity for special provision in the sink construction for that purpose, the support for the container being embodied in and forming part of the waste assembly of the sink. Consequently, the brackets will be held firmly in place under any burden, for the large clamping support of the stationary bracket which carries the others has the rigidity of the sink itself, being directly clamped to it by the large clamping ring.

Both of the containers may be completely hidden from view beneath the sink and its drain board, as shown in dotted lines in Fig. 1, or either may be brought to a forward position where it is accessible for use. The single pivot bolt serves both swinging brackets and its position may be shifted as previously noted by adjusting the position of the stationary bracket before tightening the clamping ring.

The term "waste coupling" as herein used comprises the clamping means for engaging the drain outlet of the sink and to which the drain pipe connects, as distinguished from said drain pipe intself.

What I claim as new and desire to secure by Letters Patents is:

1. A supporting bracket for a swinging container for sinks and the like, comprising a bracket member having an opening to fit over the waste connection of the sink and being adapted to be clamped between the drain outlet of the sink and the clamping ring of the waste connection, an upwardly extending strengthening flange surrounding the bracket member, and means at the free end of the bracket member for pivotally supporting a swinging container.

2. In combination with a sink and its waste coupling, an attachment comprising a stationary bracket having an opening registering with the sink outlet to receive the waste coupling of the sink whereby said bracket may be clamped to the sink bottom by the waste coupling, and a swinging container-bracket pivotally mounted on the stationary bracket.

3. In combination with a sink and its waste coupling, an attachment comprising a stationary bracket having a flanged opening fitting around the waste coupling of the sink, whereby said stationary bracket is clamped by the waste coupling to the bottom of the sink, and a swinging container-bracket pivotally mounted on the stationary bracket.

4. In combination with a sink and its waste coupling having a clamping ring, an attachment comprising a stationary bracket having an opening fitting around the waste coupling whereby said bracket is clamped between the drain outlet of the sink and the clamping ring of the waste coupling, and a swinging container-bracket pivotally mounted on the stationary bracket.

5. A swinging container support for sinks and the like, comprising in combination with the sink or the like having a flanged waste coupling engaging the interior of the drain outlet of the sink or the like and a clamping ring threaded on said waste coupling clamping the edge of the drain outlet between it and the flange, a stationary bracket having an opening fitting over the waste coupling, said bracket being clamped between the clamping ring and the edge of the drain outlet, and a swinging container-bracket pivotally mounted on the stationary bracket.

6. A swinging container support for sinks and the like, comprising in combination with a sink or the like having a drain outlet and a flanged waste coupling fitting in the drain outlet with a clamping nut for clamping the edge of the drain outlet between the flange and said clamping nut, a stationary bracket having a flanged opening fitting around the waste coupling between the clamping nut and the edge of the drain outlet, and a swinging container-bracket pivotally mounted on the stationary bracket.

7. A swinging container support for sinks and the like having waste couplings, comprising a stationary bracket clamped between the parts of the waste coupling, a pivot bolt secured thereto, and swinging container-brackets pivotally mounted on the pivot bolt.

8. A swinging container support for sinks and the like having waste couplings, comprising a stationary bracket clamped between members of the waste coupling, a flanged shouldered pivot bolt on the stationary bracket, and swinging container-brackets pivotally mounted thereon.

9. A swinging container support for sinks and the like having waste couplings, comprising a stationary bracket adapted for connection with the waste coupling and capable of radial adjustments thereon, a swinging bracket pivotally mounted on the stationary bracket, a step on the swinging bracket, and a sliding hook on the swinging bracket for engaging a container between them.

In testimony whereof, I affix my signature.

FRANK G. BROTZ.